3,298,943
METHOD OF PRODUCING RUBBER SHEET MATERIAL

Howard J. Strauss, Elkins Park, Pa., and Ernest Weiss, Trenton, N.J., assignors to ESB-Reeves Corporation, a corporation of Delaware
Filed June 27, 1962, Ser. No. 205,713
14 Claims. (Cl. 204—182)

This invention relates to a method of producing rubber sheet material and particularly microporous sheet material of substantial thickness by electrodeposition.

Heretofore, electrodeposition of rubber from latex has been accomplished; however, the thickness of the rubber has been limited to a relatively thin sheet due to the fact that as the rubber deposit increases in thickness it substantially increases the resistance to the electric current. In view of this, electrodeposition of rubber has been confined for practical purposes to relatively thin sheets in the order of a few thousandths of an inch.

The present invention overcomes the foregoing difficulty and enables rubber sheet material of substantial thickness, for example over .010 inch, to be produced in a relatively short time. In accordance with the present invention, there is provided a method of producing rubber sheet material of substantial thickness comprising the steps of immersing an anode and cathode in a bath comprising an aqueous dispersion of rubber particles having a negative charge, applying a voltage across the anode and cathode thereby causing the rubber particles to migrate to the anode for deposit thereon, and adding to the dispersion starch in a finely divided form, the starch having a negative charge and thereby migrating to the anode along with the rubber particles and providing multiple conductive paths of low resistance through the rubber particles as deposited in sheet form on the anode. The starch is also occluded during the deposition, thereby adding to the starch content of the sheet. The rubber sheet material after removal from the bath and the anode is made microporous by the additional step of removing the starch. The anode is provided with a shape corresponding with the desired shape of the article to be made from the rubber sheet material. For example, in the manufacture of girdles the anode has a shape corresponding to that of a girdle whereby the rubber sheet material is produced in the form of a seamless microporous girdle.

Figure 1:
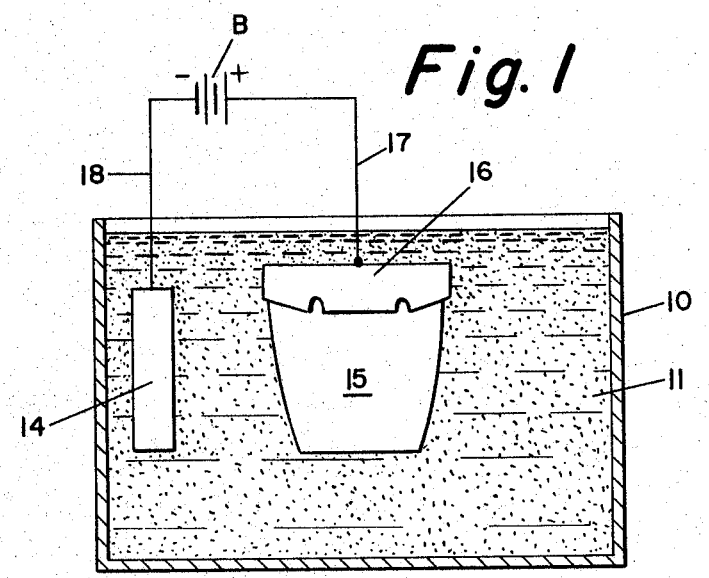
Figure 2:
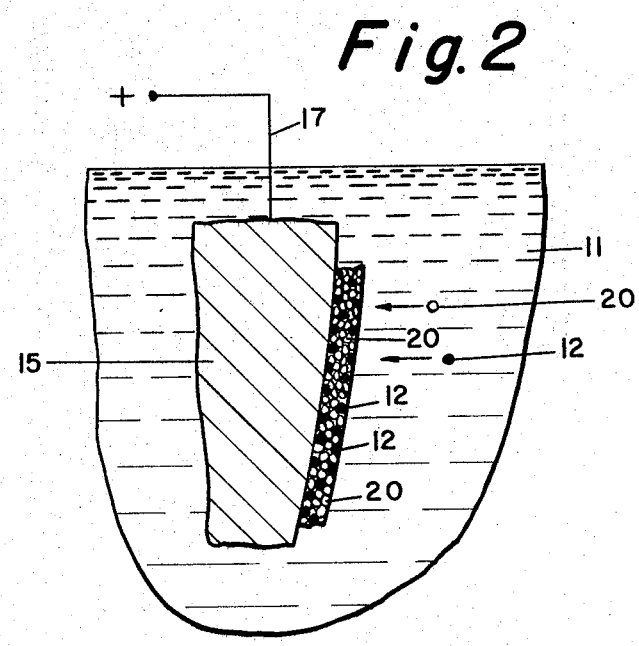

For further objectives and advantages of the invention and for a more detailed understanding thereof reference is to be had to the following description taken in conjunction with the accompanying drawing in which:

FIG. 1 is a schematic view of the present invention as applied to the manufacture of girdles; and FIG. 2 is an enlarged fractional view of FIG. 1.

Referring to FIG. 1, there is illustrated a vessel or tank 10 containing a bath 11 including an aqueous dispersion of rubber particles. The rubber particles are illustrated in FIG. 2 on an enlarged scale by the black dots identified by reference character 12. As may be seen in FIG. 1, a cathode 14 and an anode 15 are immersed in the bath 11. The cathode 14 has been illustrated in the form of a small plate and may be made from any suitable material such as nickel, iron or graphite or equivalent which does not have a deleterious effect upon rubber.

The anode 15 is made in the shape of the desired article to be produced from the rubber and for the purposes of the present invention has been illustrated as having a configuration corresponding to that of a girdle. The anode 15 may be made from any suitable metal such for example as zinc, lead, tin, cadmium, or equivalent which does not have a deleterious effect on rubber. The preferred metal being zinc because of the beneficial effects of zinc salts on rubber in the vulcanization step. Such metals as copper, manganese and alloys containing these elements should be avoided because of their deleterious effect on rubber. The anode 15 in addition to having the shape of the desired rubber article may contain any desired ornamental design, the latter being faithfully reproduced in the final product. The anode 15 in FIG. 1 is provided at the upper end thereof with an insulator 16 through which extends the electrical conductor 17 which is connected to a suitable direct current voltage source schematically illustrated as a battery B. The conductor 17 is connected to the plus side of the battery B and the negative side of the battery B is connected by way of conductor 18 to the cathode 14.

As shown in FIG. 1, both the anode 15 and the cathode 14 are immersed in the bath 11 comprising an aqueous dispersion of rubber particles having a negative charge. When voltage is applied to the anode and cathode, the rubber particles by reason of their negative charge will migrate to the anode 15 for deposit thereon. The bath 11 additionally includes starch particles 20 which are illustrated in FIG. 2 by the white dots. The starch particles in a latex as well as the rubber particles bear a negative charge and thus both will travel towards the anode 15 when an electrical potential is imposed. This is illustrated schematically in FIG. 2 by the white and black dots 20 and 12 respectively and the associated arrows. A relatively low potential such for example in the order of between 2-5 volts D.C. is adequate to cause the rubber and starch particles to migrate to the anode for deposit thereon. However, this voltage may be increased to 20-25 volts after thick deposition has occurred. After the deposit has reached the desired thickness, the anode with the deposit is removed from the bath and the rubber is dried. As may be seen in FIG. 1, the insulator 16 extends beyond the sides of the anode 15 and this may be used as a gauge for measuring the desired thickness for the rubber deposit to the built up on the anode 15.

In order to insure a uniform deposition of rubber and starch particles on the anode 15, the starch should be added in a finely divided form. This accomplished by adding the starch particles in the form of an aqueous dispersion made preferably with suitable dispersing agents such as for example a sodium salt of polymerized alkylnaphthalene sulfonic acid (0.5 part per 100 of starch).

The finely divided rubber chemicals which effect eventual vulcanization of the rubber also migrate with the rubber particles and the starch particles to the anode 15 and are deposited thereon with the rubber and starch. A mixture of rubber and starch suitable for electrodeposition is prepared as follows:

| Percent Solid | Dry | Wet |
|---|---|---|
| 60% Natural Rubber Latex | 100.0 | 167.0 |
| 10% Potassium Hydroxide | 0.5 | 5.0 |
| 10% Ammonium Caseinate | 0.5 | 5.0 |
| 60% Zinc Oxide Dispersion | 1.0 | 1.67 |
| 68% Sulfur Dispersion | 1.0 | 1.47 |
| 50% Zinc diethyl dithiocarbamate dispersion | 1.0 | 2. |
| 50% Zinc mercaptobenzothiazol dispersion | 1.0 | 2. |
| 65% Antioxidant "Superlite" | 1.5 | 2.31 |
| 50% Potato Starch dispersion | 100.0 | 200.00 |

After the deposit has reached the desired thickness, the anode 15 is removed from the bath 11 and the rubber sheet material is dried on the anode at a temperature sufficiently low to maintain the starch in particle form and prevent it from gelling. This can be assured by utilizing a temperature not exceeding 50° C. The dried rubber is then cured in hot air and then stripped from the anode 15. The curing operation may be performed at a temperature of about 140° C. and for about a period of 20 minutes. At this stage of the process, the rubber sheet material will include the starch as a filler. To make the rubber microporous, the article is treated to remove the starch. This is accomplished by mechanical rolling, followed by immersion in boiling water for about 2 hours, followed either by an acid treatment (2 hours boiling in 2% sulfuric acid) or by enzymatic degradation (24 hrs. in a 5% slurry of diastase, trypsin or pepsine).

While microporous articles may also be made by a simple dipping of a form in a coagulable latex-starch mixture, the present electrodeposition achieves the desired build-up of the requisite thickness within a substantially shorter time. Microporous rubber produced in accordance with the present process is not only useful in the manufacture of girdles but is also useful in the manufacture of other wearing apparel, such as rainwear, footwear and gloves. Additionally, it is also useful in the production of battery separators.

If it is desired that the microporous rubber be supported such for example as on a woven or knitted fabric, the fabric may first be placed over the anode and the migrating particles will then be intercepted by, and deposited on, the fabric. The subsequent treatment of the supported microporous rubber will then be the same as described above.

While the term rubber has been used herein and also in the claims, it is to be understood that this term is intended to include not only natural latex but also equivalent synthetic latices such as dispersions or emulsions of butadiene-styrene copolymers, acrylic rubbers, nitrile rubbers and the like.

What is claimed is:

1. A method of producing rubber sheet material of substantial thickness comprising immersing an anode and cathode in a bath comprising an aqueous dispersion of rubber particles having a negative charge, applying a voltage across the anode and cathode thereby causing the rubber particles to migrate to the anode for deposit thereon, and adding to the dispersion starch in a finely divided form and in an amount approximately equal to the amount of rubber particles present in the bath on a dry solids basis, the starch having a negative charge and thereby migrating to the anode along with the rubber particles and providing multiple conductive paths of low resistance through the rubber particles as deposited in sheet form on the anode.

2. The method according to claim 1 wherein the rubber sheet material after removal from the bath and the anode is made microporous by the additional step of removing the starch.

3. The method according to claim 2 wherein the anode has a shape corresponding to that of a girdle whereby the rubber sheet material is produced in the form of a seamless microporous girdle.

4. The method of producing a sheet rubber article according to claim 1 wherein the anode has a shape corresponding to the desired shape of the article.

5. The method according to claim 1 wherein the rubber and starch are present in the bath in approximately equal weights.

6. The method according to claim 1 wherein the bath includes the following mixture:

| Percent Solid | Dry | Wet |
| --- | --- | --- |
| 60% Natural Rubber Latex | 100.0 | 167.0 |
| 10% Potassium Hydroxide | 0.5 | 5.0 |
| 10% Ammonium Caseinate | 0.5 | 5.0 |
| 60% Zinc Oxide Dispersion | 1.0 | 1.67 |
| 68% Sulfur Dispersion | 1.0 | 1.47 |
| 50% Zinc diethyl dithiocarbamate dispersion | 1.0 | 2. |
| 50% Zinc mercaptobenzothiazol dispersion | 1.0 | 2. |
| 65% Antioxidant "Superlite" | 1.5 | 2.31 |
| 50% Potato Starch dispersion | 100.0 | 200.00 |

7. The method according to claim 1 wherein uniform deposition of starch and rubber is maintained by adding the starch in the form of an aqueous dispersion.

8. The method according to claim 1 wherein uniform deposition of starch and rubber is maintained by adding the starch in the form of an aqueous dispersion including at least one dispersing agent.

9. The method according to claim 8 wherein the dispersing agent comprises a sodium salt of polymerized alkylnaphthalene sulfonic acid.

10. The method according to claim 1 wherein after the deposit has reached the desired thickness the anode is removed from the bath, and the rubber is subjected to the additional steps of drying on the anode at a temperature sufficiently low to maintain the starch in particle form, curing the dried rubber at a temperature higher than the drying temperature, stripping the rubber sheet material from the anode, and removing the starch from the sheet material to make it microporous.

11. The method according to claim 10 wherein the step of drying is performed at a temperature not exceeding 50° C. and the step of curing is performed in air at a temperature of about 140° C. for a period of about twenty minutes.

12. The method according to claim 10 wherein the starch is removed from the sheet by mechanical rolling, followed by immersion in boiling water for approximately two hours and thereafter boiled for approximately two hours in 2% sulfuric acid.

13. The method according to claim 10 wherein the starch is removed by the steps of mechanical rolling, immersion of the sheet in boiling water followed by enzymatic degradation.

14. The method of producing rubber sheet material according to claim 1 wherein a fabric covering is placed on the anode prior to immersion in the bath so that the migrating particles of rubber and starch are intercepted by and deposited on the fabric.

References Cited by the Examiner

UNITED STATES PATENTS

| | | | |
| --- | --- | --- | --- |
| 1,548,689 | 8/1925 | Klein | 204—281 |
| 1,589,325 | 6/1926 | Sheppard et al. | 204—183 |
| 1,589,332 | 6/1926 | Sheppard et al. | 204—182 |
| 1,910,580 | 5/1933 | Twiss | 204—182 |
| 1,994,165 | 3/1935 | Beal | 204—182 |
| 2,092,240 | 9/1937 | Bodle | 204—182 |
| 2,822,557 | 2/1958 | Stritter | 117—165 |
| 2,945,826 | 7/1960 | Everett | 260—2.5 |

FOREIGN PATENTS

| | | |
| --- | --- | --- |
| 291,477 | 6/1928 | Great Britain. |
| 307,585 | 3/1929 | Great Britain. |
| 465,821 | 8/1935 | Great Britain. |

JOHN H. MACK, *Primary Examiner.*

JOHN R. SPECK, *Examiner.*

G. E. BATTIST, E. ZAGARELLA, *Assistant Examiners.*